United States Patent [11] 3,574,352

| [72] | Inventor | James O. Elliott<br>Xenia, Ohio |
|---|---|---|
| [21] | Appl. No. | 816,901 |
| [22] | Filed | Apr. 17, 1969 |
| [45] | Patented | Apr. 13, 1971 |
| [73] | Assignee | General Motors Corporation<br>Detroit, Mich. |

[54] AUTOMATIC VEHICLE LEVELING SYSTEM HAVING ELECTRONIC PRESSURE SWITCH CONTROL
6 Claims, 6 Drawing Figs.

[52] U.S. Cl. .................................................. 280/124, 267/65
[51] Int. Cl. ........................................................ B60g 17/00
[50] Field of Search ........................................... 280/124 (F), (LR); 267/65

[56] References Cited
UNITED STATES PATENTS

| 2,967,547 | 1/1961 | Pribonic | 280/LR |
| 3,082,018 | 3/1963 | Smirl | 280/LR |
| 3,502,347 | 3/1970 | Busignies | 280/124 |

*Primary Examiner*—Philip Goodman
*Attorneys*—W. E. Finken and J. C. Evans

ABSTRACT: In preferred form, an automatic vehicle leveling system including a fluid spring component, an electric motor-driven compressor and a storage tank. A height controller controls pressure in the fluid spring means in accordance with vehicle load. A diaphragm operated electrical switch is responsive to system pressure to complete a start circuit for the drive motor. It is associated with a solid-state control module and relay hold switch that shunt the pressure switch whereby it opens without arcing. A timer circuit in the module maintains the motor energized whereby the system is pumped down to cause the pressure switch to be pressure biased against operation in response to road movements of the vehicle.

INVENTOR.
James O. Elliott
BY
J.C. Evans
ATTORNEY

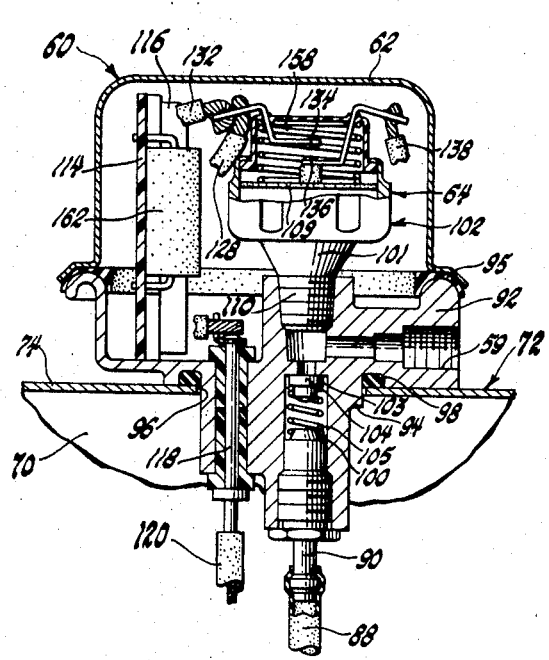

AUTOMATIC VEHICLE LEVELING SYSTEM HAVING ELECTRONIC PRESSURE SWITCH CONTROL

This invention relates to automatic vehicle-leveling systems and more particularly to such systems having an electrically motor-driven compressor controlled to vary pressurization of fluid spring components to maintain a predetermined trim height relationship between the sprung and the unsprung mass of the vehicle.

In order to improve the responsiveness of automatic vehicle-leveling systems one approach has been to provide an electrically motor-driven compressor that is directly connected to the control chamber of a pressurizable fluid spring to pump down the fluid spring means when a load is removed from the sprung mass so as to return the vehicle to a desired trim height position.

At times the electric motor therein is connected in circuit relationship with switch means that are mechanically coupled between the sprung and the unsprung mass to sense the relative height position therebetween and thereby selectively connect the electric motor in an energization circuit to produce the necessary pumpdown action. Such arrangements require direct mechanical coupling between sprung and unsprung components and adjustment of the component parts of the coupling to assure desired operation.

In other cases, the operation of the compressor is controlled by a pressure-sensitive switch means that is responsive to the pressure level in an exhaust conduit from the fluid spring means, to complete an energization circuit for the motor to effect the desired pumpdown of the fluid spring means.

One problem with such direct pressure-sensing switch means is that means must be included within the switch component to get a snap-acting movement of the switch contacts to prevent arcing of the contacts when the switch is connected in a circuit including the load represented by the motor winding. A further problem is that such switches require careful calibration and adjustment in order to obtain accurate operation of the system.

An object of the present invention is to improve automatic leveling systems of the type including an electric motor-driven compressor for pumping down fluid spring components of the system by including a pressure-sensitive switch for initiating motor operation that is associated with circuit means which isolate the pressure-sensitive switch from the load of the motor following initiation of a control cycle of operation.

A further object of the present invention is to provide an improved automatic vehicle-leveling system of the type including an electric motor-driven compressor for pumping down fluid spring components of the system wherein a control cycle of operation is initiated by a height controller directing exhaust pressure from the fluid spring means against a low-cost pressure-responsive diaphragm-operated start switch and wherein the control cycle of operation is terminated independently of the low-cost pressure-sensitive switch by means including a hold switch which is associated with time delay means for terminating the control cycle of operation at a point where the pressure switch is subjected to a predetermined pressure level that opens its contacts and prevents operation of the switching components therein in response to vehicle movements.

A further object of the present invention is to improve the reliability and control of a automatic vehicle-leveling system of the type including an electric motor-driven compressor to pump down fluid spring components, a leveling system by the provision of means including a low-cost oil-type pressure start switch that starts a control operation and thereafter is disconnected from the load circuit represented by the electric motor by a hold switch and wherein means including a three-terminal solid-state switching device control, the hold switch to maintain the motor energized for a predetermined period of time after the start switch opens and the pressure-sensitive start switch is subjected to a pressure that prevents it from operating in response to road movement of the vehicle.

These and other objects of the present invention are attained in one working embodiment thereof which includes a pair of combination shock absorber and air spring units that are adapted to be connected between the sprung and unsprung mass of the vehicle. The pressurizable control chambers of the units are interconnected by a crossover tube and an exhaust conduit runs from one of the control chambers of the inlet fitting of a three-position, damped mechanical height controller. An outlet fitting from the controller is connected to the inlet of a switch and delay assembly which includes a low-cost oil-pressure-sensing electrical switch. The pressure switch is a single-pole, single-throw unit operated by a flexible diaphragm that is directly exposed to an inlet to the switch and delay assembly. The assembly is communicated by a tube to a reciprocating compressor located within the interior of a pressurizable storage tank. A one-way check valve component located between inlet and compressor prevents bleedback from the tank to the switch. The compressor has its outlet in direct communication with the interior of the tank and a fluid path is provided through the switch and delay assembly to an inlet fitting of the height controller.

An electrical drive motor for the compressor is electrically connected to the pressure switch and to a normally opened relay-operated switch. The positive terminal of the vehicle battery is electrically connected to both the pressure switch and the normally opened relay-operated switch to control the energization of the motor when the height controller directly communicates the pressure switch with the fluid springs.

The system further includes a circuit board having a semiconductor switching component thereon and a RC circuit for controlling conductivity of the solid-state switching component.

Initially, when the height controller communicates the pressure switch with the air springs the motor is energized to pump down the fluid springs. Concurrently, the relay-operated switch is conditioned to hold an energization circuit for the motor. This serves to shunt an operating load from the pressure switch.

Following a predetermined pumpdown period the pressure switch opens and the RC circuit following a delay conditions the semiconductor switch to cause the relay-operated switch to open and thereby deenergize the motor. The final delay phase of the control cycle produces a pressure level within the pressure switch and delay assembly that will bias the pressure start switch against operation in response to ordinary road movements.

Further objects and advantages of the present invention will be apparent from the following description, reference being had to the accompanying drawings wherein a preferred embodiment of the present invention is clearly shown.

In the drawings:

FIG. 1 is a diagrammatic view of a pumpdown type automatic leveling system including the control components of the present invention;

FIG. 2 is an electrical circuit diagram of a motor controller for use in the present invention.

FIG. 3 is an enlarged view in vertical section of a pressure switch and delay assembly used in the present invention;

FIG. 4 is a top view of the assembly in FIG. 3 with its cover removed.

FIG. 5 is a side elevational view of the assembly in FIG. 3; and,

FIG. 6 is a fragmentary view in vertical section taken along the line 6—6 of FIG. 4.

Figures 1, 2:
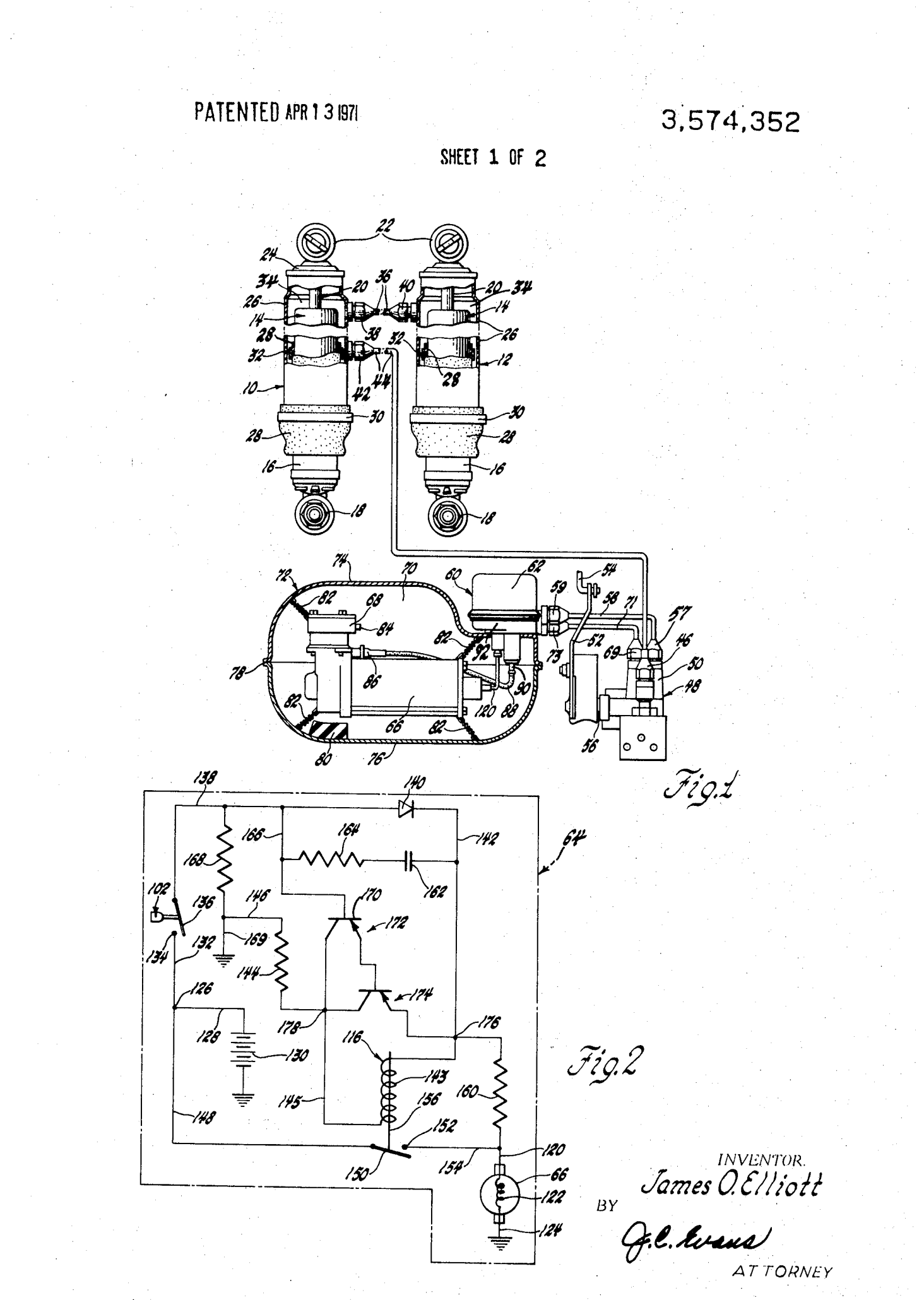

Referring now to FIG. 1, an automatic leveling system is illustrated of the type including a pair of combination shock absorber and air spring assemblies 10, 12 that are adapted to be connected between the sprung and unsprung mass of a vehicle to control the relative height relationship therebetween.

For purposes of the present invention, it is only necessary to point out that the combination assemblies 10, 12 each include a hydraulic double direct-acting shock absorber 14 having an outer cylinder 16 with a bottom mount 18 thereon that is adapted to be connected to the unsprung part of a vehicle, for example the rear axle housing of a rear suspension assembly.

The shock absorber further includes a reciprocating piston rod 20 that extends upwardly and outwardly of the cylinder 16. It is secured to an upper mount 22 that is adapted to be connected to a sprung part of a vehicle for example, the lower frame of the vehicle chassis.

The piston rod 20 also is connected to a top 24 of a cylindrical dust shield 26 that is located in telescoping spaced relationship with the cylinder 16. The dust shield is fixedly connected to one end of a flexible sleeve 28 by a clamp 30. The sleeve 28 is turned inwardly of itself and has the opposite end thereof fixedly secured by a mounting ring 32 to the outer surface of the cylinder 16.

The outer cylinder 16, dust shield 26 and flexible sleeve 28 cooperate to define a variable volume, pressurizable control chamber 34 in each of the assemblies 10, 12. The combination assemblies 10, 12 thereby are capable of effecting a variable uplifting force on the sprung mass to correct for changes in the static loading thereon.

The above-described combination assemblies 10, 12 are merely representative of one suitable fluid spring component in an automatic leveling system for producing such uplifting force. For a more detailed explanation of the type of units reference may be had to U.S. Pat. No. 3,063,701 to Long issued Nov. 13, 1962. It should be understood, however, that other fluid spring means such as elastomeric bellows or bladders located within the primary coil spring of a vehicle between its sprung and the unsprung components and operative to produce a variable uplifting force on the sprung mass to maintain a predetermined relationship between it and the unsprung mass are equally suitable for use with the present invention.

In the illustrated arrangement, the control chambers 34 of the respective assemblies 10, 12 are intercommunicated by a cross tube 36 connected between side couplings 38, 40 on the assemblies 10, 12 respectively.

A second fluid coupling 42 on the dust shield 26 of the assembly 10 is connected to one end of a fluid conduit 44 which has its opposite end connected to a fluid coupling 46 of a three-position height controller 48.

The controller 48 is of the type having an outer housing 50 fixedly secured to either the sprung or unsprung mass of the vehicle and further including an oscillatable lever 52 thereon which is pivotally connected to one end of a link 54 that has its opposite end pivotally connected to the other one of the masses. Accordingly, upon relative movement between the sprung and unsprung masses the lever 52 will oscillate so as to move an operating shaft 56 extending from the housing 50 of the controller 48. This will condition valve means (not shown) to first and second and third control positions.

The type of controller 48 is merely representative of one suitable height controller of the type sensing relative height relationship between the sprung and unsprung masses of a vehicle to control fluid flow within a pressurized automatic leveling system. The controller 48 in particular is of the type set forth in detail in U.S. Pat. No. 2,967,547 to Pribonic issued Jan. 10, 1961.

In the illustrated arrangement it includes an outlet fitting 57 that is connected by a conduit 58 to an inlet port 59 of a pressure switch and delay assembly 60. It has a cover 62 that houses a motor controller 64 for controlling the energization of a DC electric drive motor 66 that operates a reciprocating air compressor 68.

Additionally, the height controller 48 includes an exhaust fitting 69 thereon that is connected by conduit 71 to an outlet port 73 from the assembly 60.

More specifically, in the illustrated arrangement, the drive motor 66 and the reciprocating compressor 68 are located within the interior 70 of a hermetically sealed pressure storage tank 72. The tank includes an upper half 74 joined to a lower half 76 at a continuously formed belt line 78 by suitable fastening means such as resistance welding.

A resilient bump stop 80 prevents the drive motor 66 and the compressor 68 from bumping against the tank 72 because of large amplitude movements therebetween as produced for example by extreme road shock conditions.

The motor and compressor 66, 68 are resiliently supported in the interior 70 by a suitable spring-suspension system representatively illustrated as including a tension spring 82 connected between the joined compressor and drive motor at each corner thereof and the interior surface of the pressure storage tank 72.

The compressor 68 includes an outlet 84 in direct communication with the interior of the tank 70 and it further includes an inlet 86 that is connected by an inlet tube 88 with a port 90 through a base 92 on assembly 60. Base 92 is secured to the tank 72 by weld nut and screw fastener assemblies 93 best shown in FIG. 4. A gasket 95 seals between cover 62 and base 92 which are connected by screws 97.

The base 92 more particularly includes a large diameter hub 94 directed through an opening 96 in the upper half 74 of the tank 72. An O-ring seal 98 is sealingly located between the hub 94 and the base 92 to seal the opening 96. The interior of cover 62 is vented to atmosphere through vent port 99 in base 92.

The inlet 59 is communicated with the tube 88 through a passageway 100 within base 92. By virtue of the above, an inlet fluid flow path is defined from the fitting 46 on the controller 48 to the compressor inlet 86 by means including the conduit 58, the fitting 59, the passageway 100, thence through the port 90 and the tube 88 to the inlet 86.

The passageway 100 is closed at its upper end by an enclosure 101 of pressure switch 102 of controller 64. A valve seat 103 in passageway 100 has a valve element 104 spring biased thereagainst by a spring 105 to prevent backflow of fluid from compressor 68 to the assembly 60.

Additionally, as best seen in FIG. 5, the system includes an outlet path from the tank interior 70 which includes port 106 to a lateral bore 107 in base 92 which is axially aligned with a side port 108 in the base 92 that in turn is in communication with port 73. The outlet path from the interior 70 is thence completed through conduit 71 and fitting 69 back to the controller 48.

During periods when the sprung and unsprung mass are maintained at a predetermined height relationship therebetween the controller 48 is conditioned by the link 54 and lever 52 so as to cause the valve means therein to assume the first control position, henceforth referred to as "neutral" to block the conduit 44 from the tank 72 and compressor 68.

When the sprung mass is moved toward the unsprung mass by the addition of static load on the sprung mass the link 54 will cause the lever 52 to oscillate in a direction so as to condition the valve means of the controller 48 into the second control position, henceforth referred to as "fill," to open communication between the tank interior 70 and the conduit 44 whereby a precharge of pressure within the tank interior 70 will quickly pass from outlet opening 106 in base 92 thence through port 73 to inflate the control chambers 34 of the assemblies 10, 12 to produce a resultant uplifting action to correct for the increase in static loading so as to return the vehicle to the desired predetermined height relationship where the controller 48 will again block flow to or from the conduit 44.

In accordance with certain principles of the present invention, any static load change that results in a condition where the sprung mass moves away from the unsprung mass will cause the compressor 68 to be driven by the DC electric motor 66 to pump down the control chambers 34 of the assemblies 10, 12 through the conduit 44.

More particularly, when such a reduction in static loading occurs the controller 48 will be positioned by the link 54 and lever 52 in the third control position, henceforth referred to as "exhaust," so as to open communication between the conduit 44 and the inlet 86 to the compressor.

When in its exhaust position the controller 48 will cause a pressure in the switch 102 corresponding to that of the control chambers 34. This pressure increase acts upon a diaphragm operator 109 in switch 102 through a hollow pedestal base 110 that is threadably seated within the upper end of passageway 100 in the upper face of the base 92.

In addition to the pressure control switch 102, the motor controller 64 further includes a solid-state module or circuit board 114 on one side thereof and a relay-operated hold switch 116 that has one terminal thereof electrically connected by a pin conductor 118 to an electrical lead 120 that connects to one end of a run winding 122 of the motor 66. The opposite end of the winding is connected by an electrical lead 124 to ground.

In accordance with certain principles of the present invention, the pressure switch 102, the relay-operated switch 116 and the solid-state module 114 cooperate to produce a reliable fail safe control of the motor 66 whereby an accurate pumpdown of the system including control chambers 34 of the assemblies 10, 12 will occur when the height-sensing mechanically operated height controller 48 detects a relative height position between the sprung and unsprung mass that corresponds to a reduction in the static loading on the sprung mass to assume its exhaust control position.

The motor controller 64 is more specifically illustrated in the electrical circuit diagram of FIG. 2 including a terminal 126 that is electrically connected by a conductor 128 to the positive terminal of a vehicle battery 130.

This circuit includes a coil energization, motor start network from terminal 126 through a conductor 132 that is electrically connected to a fixed contact 134 of the pressure switch 102. A single-pole single-throw movable contact 136 of the switch 102 is electrically connected by a conductor 138 to one side of a diode 140. A conductor 142 electrically connects the opposite side of diode 140 to one end of a coil 143 of relay-operated switch 116 thence through conductor 145 to a resistor 144 having the opposite end thereof electrically connected by a conductor 146 to ground.

Accordingly, when the pressure switch 102 detects a predetermined cut-in pressure buildup within the pedestal 110 during periods when the controller 48 communicates the control chambers 34 with the switch 102, the diaphragm 109 will flex to close contacts 134, 136 to complete a circuit for energizing coil 143. Hence, in the controller 64 the switch 102 is in effect a start switch for pumpdown.

Additionally, the controller 64 includes a motor energization hold network for maintaining the run winding 122 energized. More specifically, this circuit runs from the positive terminal of battery 130 through conductor 128, terminal 126 thence through a conductor 148 to a movable contact-carrying blade 150 of the relay-operated switch 116. The blade 150 is normally open with respect to a fixed contact 152 that is electrically connected by a conductor 154 to the lead line 120 to the run winding 122 and conductor 124 to ground.

When the pressure switch 102 closes, the coil 143 will be energized instantaneously to move an armature 156 in a direction to hold the movable contact-carrying arm 150 of switch 116 closed so as to complete an energization hold circuit for the motor run winding 122.

The resistor 144 and the parallel energization circuit to the run winding 122 results in a reduced load on the switch 102 once the relay-operated switch 116 is closed. Accordingly, when a predetermined cutout pressure exists in the pedestal 110 and a return spring 158 in the switch housing causes diaphragm 109 to be moved to open contacts 134, 136 the contacts of switch 102 are protected against arcing.

In accordance with certain principles of the present invention, the compressor 68 will pump down the control chambers 34 of the assemblies 10, 12 until the height controller 48 is again returned to a position where it blocks communication between the conduit 44 and the remainder of the closed loop system. Following closure of controller 48, the motor controller 64 is operative to maintain the motor 66 energized for a predetermined delay period until a low pressure condition exists within the pedestal 110 sufficient to maintain a pressure-biased opened condition between the movable contact-carrying arm 136 and the fixed contact 134 thereof. The bias is caused by atmospheric pressure and spring 158 on the upper face of diaphragm 109 and a below atmospheric pressure on the underside of diaphragm 109. It is of a magnitude that will prevent ordinary road movement forces from causing a premature mating of the movable and fixed contacts of the switch 102 so as to initiate a pumpdown cycle of operation other than when called for by the height controller 48.

More particularly, to attain the pressure bias in the illustrated embodiment of the invention, the controller 64 includes a RC charging circuit from battery 130 through conductor 148, switch 116, a resistor 160 connected between switch 116 and coil 143, conductor 142, to a capacitor 162. The circuit continues through resistor 164 between capacitor 162 and a conductor 166 to conductor 138. A timing resistor 168 is connected between conductor 138 and a conductor 169 to ground.

When the pressure switch 102 is opened, the control chambers 34 are substantially exhausted by the compressor 68 and the height controller 48 blocks communication between conduit 44 and conduit 58. To pressure bias the switch 102 as mentioned above, the motor energization circuit is maintained for a fixed predetermined delay period following vehicle leveling. The delay is established by the time required to charge the capacitor 162 through the above-described circuit.

When a predetermined charge is produced on the capacitor 162 a current pulse occurs in conductor 166 which is connected to the base 170 of a pair of PNP transistors 172, 174. More particularly, the transistors 172, 174 are arranged in an alpha-Darlington configuration wherein the emitters of the transistors 172, 174 are connected to one end of the coil 143 and the collectors thereof are connected to the opposite end of the coil 143 whereby the transistor pair 172, 174 is located in shunt relationship thereto.

As a result, when the current pulse in the conductor 166 is imposed on the base 170, following the time delay established by the above-described RC circuit, the transistor pair will be rendered conductive anode terminal 176 to the cathode terminal 178 thereof, through resistor 144 to ground. This causes the coil 143 to be deenergized thereby to cause the switch 116 to open and result in deenergization of the motor 66.

Since the controller 48 is closed the predetermined delay of final pumpdown results in the volume represented by the conduit 58, port 59, the hollow interior of pedestal 110, passageway 100, port 90 and tube 88 being pumped below atmospheric pressure. This produces a resultant force across the diaphragm 109 that positively maintains separation between the fixed contact 134 and the movable contact carrying arm 136.

The resultant effect is that the switch 102 is maintained open even though it is subjected to substantial jolts, temperature variations or other factors that would conceivably cause a premature mating of the contacts 134, 136 and a resultant premature operation of the compressor drive motor 66. The system is, therefore, rendered fail safe in that it is not operated other than when the controller 48 directly communicates the control chambers 34 with the pressure switch and delay assembly 60.

In the illustrated circuit, diode 140 is included to prevent charging of the capacitor 162 until the relay switch 116 is closed and pressure switch 102 is opened.

The resistor 144 will maintain the transistors 172, 174 conductive after the initial base current pulse to avoid relay chatter at contacts 150, 152.

The system is operated during fill so as to effect an instantaneous pressurization of the fluid springs when static loading is added to the vehicle. Furthermore, the compressor inlet is precharged by the pressure in the fluid springs during the exhaust phase of operation and the supercharge again reduces the time required to pump down the fluid springs to return the vehicle to a level attitude when static loading has been removed therefrom.

In one working embodiment of the system which was incorporated on a 1967 model Cadillac with a standard suspension vehicle loads of 1,100—1,200 pounds were corrected within 15 seconds. On the removal of a maximum load-following leveling, the aforedescribed system resulted in a return to a desired trim height relationship between the sprung and the unsprung mass with a period of time of from 1 to 1½ minutes during which time compressor motor 66 was energized so as to cause the compressor 68 to produce pumpdown.

To effect the aforementioned correction within the time limits set forth the working embodiment of the invention included the following electrical and mechanical characteristics.

| Components | Ratings |
|---|---|
| Compressor 68 | .077 cubic inch displacement. |
| Drive motor 66 | 7.8 amps at 12 volts. |
| Tank 72 | 120–180 p.s.i.g. |
| Assemblies 10, 12 | 10–120 p.s.i.g. |
| Switch 102 | 18 p.s.i.g. cut-in and cut-out. |
| Battery 130 | 12 volts. |
| Diode 140 | .5 amps at 50 volts. |
| Coil 143 | 50 ohms. |
| Resistor 144 | 10 ohms, ½ watt. |
| Resistor 160 | 47 ohms, 2 watts. |
| Capacitor 162 | 100 mfd., 25 volts. |
| Resistor 164 | 1 kohms, ½ watt. |
| Resistor 168 | 120 kohms, ½ watt. |
| Transistor 178 | Motorola MPS 6523. |
| Transistor 180 | Motorola MPS 6534. |

By virtue of the above-described system, a low-cost reliable operation of a pumpdown electric motor in a leveling system is attained. It is done by means that eliminate switch chatter and arcing and by means of a very low-cost oil-type pressure-sensing switch that initiates and terminates the operation of the compressor 66 through means including a common three-terminal semiconductor switching device. Furthermore, the motor control configuration has a relay-operated hold switch for maintaining the motor energization circuit during most of the pumpdown phase of operation.

By virtue of the aforedescribed controller 64, the system can be accurately calibrated for a predetermined type of operation without the need for adjusting and carefully calibrating component parts of a mechanical switch. Rather, in accordance with certain principles of the present invention a solid-state timer controlled network of the type that only requires adjustment of RC circuit components is included to produce exact points of operation in the system whereby fluid spring components therein can be quickly and accurately pumped down to return the vehicle to a predetermined desired level attitude when static load is removed therefrom.

While the embodiments of the present invention, as herein disclosed, constitute a preferred form, it is to be understood that other forms might be adopted.

I claim:

1. In an automatic leveling system for maintaining a predetermined height relationship between the sprung and the unsprung masses of a vehicle the combination of: fluid spring means including a control chamber pressurizable to produce a variable uplifting force to supplement the load-carrying capacity of a primary suspension spring and correct for deflection as produced by changes in static loading on the sprung mass, a pressure storage tank, a compressor having an inlet and an outlet, electric motor means for driving said compressor, said compressor outlet being in direct communication with the interior of said storage tank, a height controller responsive to changes in the height relationship between the sprung and unsprung mass, means including said height controller for communicating the interior of said tank with said fluid spring means during a fill phase of operation, means including said height controller for directly communicating said compressor inlet with said fluid spring means during an exhaust phase of operation a source of power, a pressure-responsive start switch connected to said source of power, holding circuit means for connecting said electric motor means to said source of power including a normally open relay-operated switch, said relay-operated switch having a coil energizable to close said switch, start circuit means including said pressure-responsive switch for sensing the pressure in said compressor inlet during the exhaust phase and being conditioned to energize said coil, means to maintain said coil energized to close said relay-operated switch for maintain said motor energized for a time delay period following opening of said pressure switch means to reduce the pressure at said compressor inlet thereby to pressure bias said pressure-responsive switch means to prevent contact chatter therein, and means for shunting said coil to cause said relay-operated switch to open following the predetermined time delay.

2. In a closed loop leveling system for maintaining a predetermined height relationship between the sprung and unsprung mass of a vehicle the combination of fluid spring means, a height controller responsive to changes in the height relationship between the sprung and the unsprung mass, a single conduit connected between said fluid spring means and said height controller, a pressure storage tank, a pressure switch and delay assembly on said tank, an exhaust conduit connected between said assembly and said height controller, a compressor having an inlet in communication with said assembly and an outlet directly communicating with the interior of said storage tank, said height controller being operative upon an increase in static load on the sprung mass of the vehicle to direct high-pressure fluid from the storage tank to said fluid spring means to support the added static load, said height controller directly communicating said fluid spring means with said exhaust conduit and assembly when static loading is removed from the sprung mass, a pressure-responsive start switch in said assembly sensing pressure in said exhaust conduit and operative in response thereto, an electric motor operatively connected to said compressor to operate said compressor so as to pump down said fluid spring means, a power source, an energization circuit for said electric motor including a hold switch with an energizable coil, means to energize said coil including said pressure start switch when it senses a high pressure in said exhaust conduit, said hold switch coil being connected to said power source on said hold switch during motor energization to maintain a hold circuit from said power source to said motor, means for shunting said coil and operative in response to opening of said pressure start switch to deenergize said coil to open said hold circuit, and timer means for preventing operation of said means for shunting for a delay period following opening of said pressure switch, said pressure switch including a pair of contacts and diaphragm means for operating said contacts open and closed in response to a single pressure, said compressor being operative during the delay period to pump down said exhaust conduit between said assembly and said height controller to establish a pressure on said diaphragm means of a magnitude to bias said contacts positively opened to prevent closing movement or chatter in response to vehicle road movements.

3. In an automatic vehicle-leveling system the combination of: fluid spring means for maintaining a predetermined height relationship between the sprung and unsprung mass of the vehicle, a pressure storage tank, a compressor having an outlet in direct communication with the interior of said pressure storage tank and an inlet, means for communicating said compressor inlet with said fluid spring means including a height controller and a pressure-responsive switch means, means for communicating the interior of said tank with said fluid spring means including said height controller, said height controller normally blocking communication to and from said fluid spring means when the vehicle is level, said height controller responding to a first predetermined relative movement between the sprung and unsprung mass to directly communicate the interior of said storage tank with said fluid spring means for producing a supplemental upward resultant force on the sprung mass, said controller being responsive to a second predetermined relative movement between the sprung and unsprung mass to directly communicate said fluid spring means with said pressure-responsive switch means, means for driving said compressor including an electric motor, an energization circuit for said electric motor including a hold switch operative when said fluid spring means are communicated by said height controller with said pressure-responsive switch means to energize said compressor motor so as to draw fluid through said compressor inlet from said fluid spring means, said hold switch having an energizable coil means including said hold switch maintaining said coil energized following motor energization, said electric motor being operative to draw down said fluid spring means to maintain a predetermined height relationship between the sprung and unsprung mass of the vehicle, and time delay means for operating said electric motor for a predetermined time period following return of the sprung and unsprung mass to their predetermined height relationship so as to maintain a predetermined pressure on said pressure-responsive switch means to prevent road induced movements from causing operation thereof during periods when the vehicle is level.

4. In the combination of claim 3, said time delay means including a transistor having its emitter and collector connected in shunt relationship to said coil, and means for producing a predetermined signal on the base of said transistor through means including said hold switch a predetermined time period following leveling.

5. An automatic vehicle-leveling system for maintaining a predetermined height relationship between the sprung and unsprung mass of a vehicle comprising: fluid spring means pressurizable to correct for changes in the height relationship between the sprung and the unsprung masses, a source of pressure including a compressor having an inlet and an outlet, an electric drive motor for operating said compressor, means for directly communicating the outlet of said compressor with said pressurizable fluid spring means including a height controller for sensing the relative height position between the sprung and unsprung mass, means for communicating the inlet of the said compressor with said fluid spring means including an enclosure having a single-pole, single-throw diaphragm operated switch therein, said height controller including means for preventing fluid flow either to or from said fluid spring means when a desired predetermined height relationship exists between the sprung and unsprung mass, said height controller further including means for communicating said fluid spring means with said enclosure when a predetermined static load is removed from the sprung mass, said pressure switch opening and closing at a predetermined fixed pressure point, a relay switch having a coil, first circuit means including said pressure switch for energizing said coil to operate said relay switch, second circuit means responsive to energization of said coil and operation of said relay switch to complete an energization circuit for said electric motor for pumping down said fluid spring means to compensate for reduced static loading thereon, and means responsive to opening of said pressure switch following a predetermined pumpdown to initiate a time delay period wherein said second circuit means is maintained conditioned to energize said electric motor until the pressure in said enclosure is reduced below the pressure required to open said single-pole, single-throw switch thereby to maintain said single-pole, single-throw switch biased against road movements of the vehicle, said second circuit means including means to remove an electric load from said pressure switch thereby allowing it to open without arcing following said predetermined pumpdown.

6. An automatic vehicle-leveling system for maintaining a predetermined height relationship between the sprung and unsprung mass of a vehicle comprising fluid spring means pressurizable to correct for changes in the static loading on the sprung mass of the vehicle, means including a compressor having an inlet and an outlet for defining a pressure source for the fluid spring means, an electric motor for driving said compressor means for communicating the inlet of said compressor with said fluid spring means, first circuit means including a pressure-sensitive switch means responsive to the pressure level in said fluid spring means responsive to the pressure level in said fluid spring means to energize said compressor for causing it to pump down said fluid spring means so as to correct for removal of static load from the sprung mass of the vehicle, second circuit means for maintaining said motor energized during pumpdown, and third circuit means operative when said pressure switch senses a predetermined pressure to maintain said compressor energized for a predetermined delay period to reduce the level of pressure on said pressure switch means below said predetermined pressure, said pressure switch including means conditioned by said level of pressure below said predetermined pressure to prevent operation of said pressure switch means in response to road movements between the sprung and the unsprung mass of the vehicle.